United States Patent [19]

Garrison

[11] 4,211,287
[45] Jul. 8, 1980

[54] FOLDING TOOL BEAMS WITH LEVEL EQUALIZER THEREBETWEEN

[75] Inventor: Harold K. Garrison, Newton, Kans.

[73] Assignee: Hesston Corporation, Heston, Kans.

[21] Appl. No.: 914,075

[22] Filed: Jun. 9, 1978

[51] Int. Cl.$^2$ .................. A01B 73/00; A01B 5/06
[52] U.S. Cl. ........................... 172/311; 172/568;
172/588; 280/411 A; 280/656
[58] Field of Search ............. 172/240, 310, 311, 456,
172/568, 569, 581, 583, 584, 585, 586, 587, 645,
646, 649, 650, 655, 656, 588; 280/411 R, 411 A,
411 B, 411 C, 412, 413, 656; 56/228, 385

[56] References Cited

U.S. PATENT DOCUMENTS

| 2,901,268 | 8/1959 | Christensen | 172/456 X |
| 3,334,916 | 8/1967 | Tibbals | 172/310 X |
| 3,493,247 | 2/1970 | Tassett et al. | 280/411 A |
| 3,523,699 | 8/1970 | Sinkule et al. | 172/311 X |

*Primary Examiner*—Richard T. Stouffer

*Attorney, Agent, or Firm*—Schmidt, Johnson, Hovey & Williams

[57] ABSTRACT

A horizontally folding implement has a pair of tool-supporting beams that project laterally outwardly from opposite sides of the central, fore-and-aft extending frame of the implement when the beams are in their widespread, working positions. A pair of vertical pivots on opposite sides of the longitudinal axis of the frame adapt the beams for horizontal swinging between such working position and a folded, transport position, while a pair of horizontal pivots adapt the beams for limited vertical swinging movement in order to accommodate variations in ground contour. A pivotal coupling between the proximal inner ends of the beams when the latter are in their working positions keeps the two inner ends at the same height relative to one another during terrain variations encountered by the ground wheels or the tools of the beams, but the coupling does not inhibit horizontal swinging of the beams between their working and transport positions.

10 Claims, 6 Drawing Figures

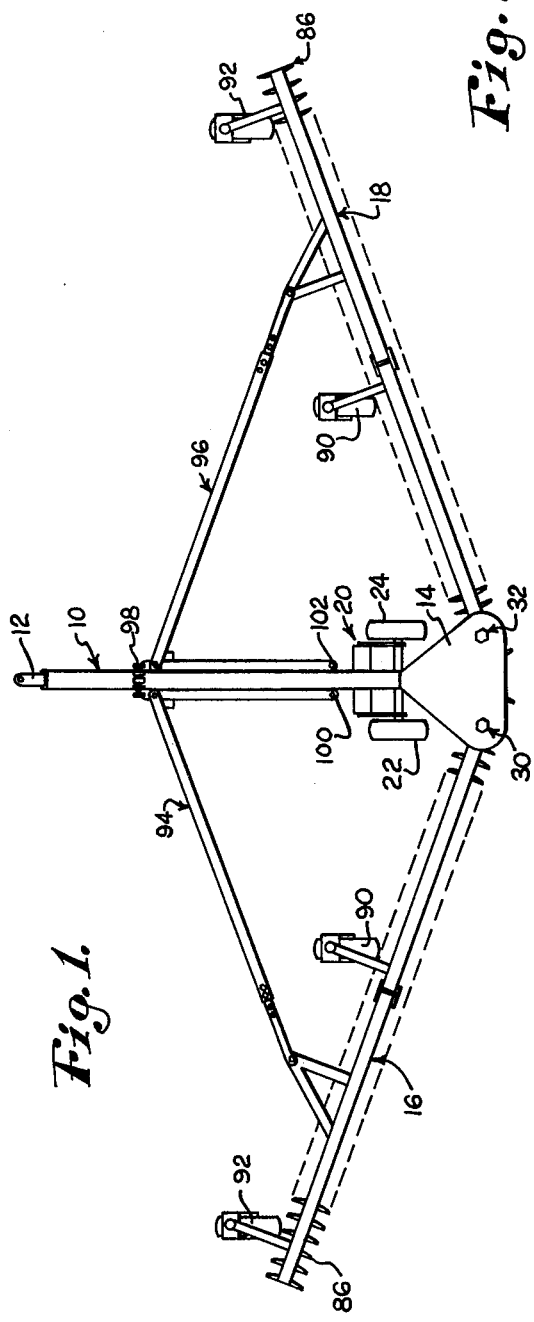
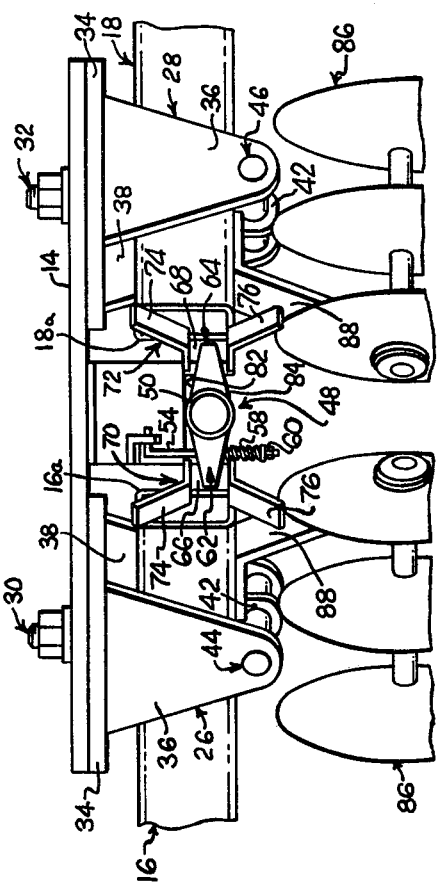
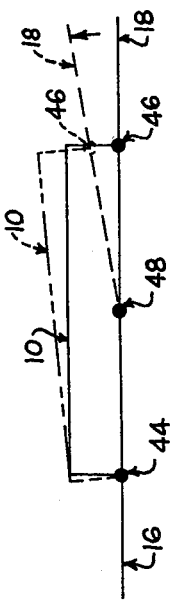

FOLDING TOOL BEAMS WITH LEVEL EQUALIZER THEREBETWEEN

TECHNICAL FIELD

This invention relates to tillage implements and, more particularly, to a folding-type tillage implement wherein the tool beams thereof swing in horizontal planes between working and transparent positions.

BACKGROUND ART

The horizontally folding implement herein described is similar in many respects to the implement of copending application Ser. No. 825,903, filed Aug. 19, 1977, now abandoned, as a continuation of Ser. No. 690,945, filed May 28, 1976, now abandoned, both of such applications being in the names of Adee, et al, carrying a title "Fold-Back Implement Frame Having Angle Adjustment," and assigned to the assignee of the present invention.

The implement of that application has its tool beams connected to the central fore-and-aft tongue or frame via special pivot assemblies that provide for both horizontal swinging of the beams between their working and transport positions and for limited vertical swinging movement to accommodate changes in ground contour. While it is, of course, necessary and desirable for the implement to have the ability to flex vertically as terrain variations are encountered, it has been found that such flexure also can create problems if not properly controlled.

In this regard, and as one example of the type of problem that can arise, consider that there is substantial side thrust inwardly along the line of discs carried by the beams as the discs engage and work the ground. Such inward thrust creates a moment about the horizontal pivot of a tool beam, thus tending to raise the pivot at the inner end of the beam. If for any reason the beam is raised slightly such as upon encountering high ground relative to that encountered by the opposite beam, there is a tendency for this upward moment to keep the beam raised, even after the terrain causing the rise has been passed. In other words, the moment resists return of the beam back down to its proper position.

SUMMARY OF THE INVENTION

In order to alleviate this and other problems and yet not inhibit the free horizontal swinging of the beams between their two extreme positions, the present invention contemplates a special pivotal coupling between the inner ends of the two beams that holds such inner ends at substantially the same relative vertical position and yet releases the beams from one another during horizontal swinging to and from their transport positions. Where previously the individual beams have accommodated changes in ground contour by swinging vertically about their individual horizontal pivots, the effect of the present invention is to now cause the beams to swing about the pivotal coupling located between the horizontal pivots, and because this coupling maintains the inner ends of the beams at substantially the same height relative to one another, the effect is for the beam on one side of the implement to counteract the lifting moment generated with respect to the opposite side of the implement, thereby helping to return the raised beam down to its proper working position when the rise has been passed over.

Technically, the pivotal coupling between the two horizontal pivots is subdivided into a pair of pivots spaced a short distance apart in order to reduce wear and strain on the various parts involved and to facilitate engagement and disengagement of the beams with and from the coupling during swinging of the beams between their working and transport positions. In theory, however, the two pivots of the coupling essentially behave as one because the result is to maintain the inner ends of the beams together while the outer ends and their horizontal pivots may rise and fall about the pivotal coupling to the extent necessary to accommodate variations in ground contour.

BRIEF DESCRIPTION OF THE DRAWINGS

FIG. 1 is a top plan view of a horizontally folding implement constructed in accordance with the principles of the present invention;

FIG. 2 is an enlarged, fragmentary, rear elevational view thereof taken centrally of the implement;

FIG. 6 is a simplified line diagram of the relationship of various parts of the implement during flexing to accommodate changes in ground contour.

DETAILED DESCRIPTION

Figure 3:
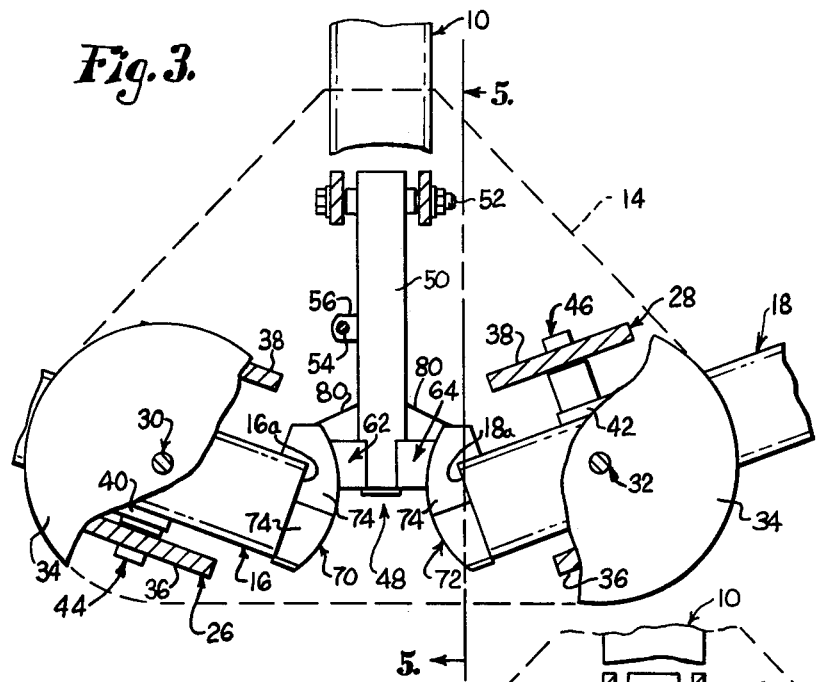
FIG. 3 is an enlarged, top plan view of the implement corresponding to FIG. 2 and with a structural triangular member removed to reveal details of construction, certain other structural portions also being broken away for clarity.

The implement has a central, fore-and-aft extending frame 10 having a clevis 12 at its forward end and a triangular, structural plate 14 at its rear end. The clevis 12 adapts the implement for connection to a towing vehicle (not shown), while the plate 14 provides a way of joining the frame 10 with a pair of tool-supporting beams 16 and 18 in a manner which will subsequently be described. A wheel assembly 20, including a pair of ground wheels 22 and 24, supports the frame 10 for over-the-ground travel, said assembly 20 including a hydraulic lift cylinder (not shown) for raising and lowering the frame 10 relative to the ground.

Figure 5:
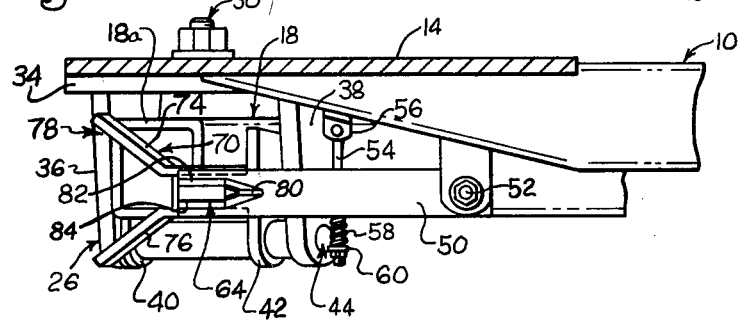
FIG. 5 is an enlarged, fragmentary cross-sectional view of the implement taken substantially along line 5—5 of FIG. 3.

A pair of depending yokes 26 and 28 are suspended beneath the plate 14 at the two rear corners of the latter, said yokes 26 and 28 being rotatable relative to the plate 14 about a pair of vertical pivots 30 and 32 equally spaced from and on opposite sides of the longitudinal axis of the frame 10. Although not shown in detail, it is to be understood that each pivot 30, 32 rotatably carries a circular turntable 34 of the corresponding yoke 26 or 28 directly below the plate 14 and that the depending ears 36 and 38 of each yoke 26, 28 project downwardly from the turntable 34 on opposite sides of the axis of the corresponding pivot 30 or 32. A pair of lugs 40 and 42 (see FIG. 5) are rigidly affixed to each of the beams 16, 18, respectively, and project downwardly therefrom between the ears 36, 38. The ears 36, 38 and the lugs 40, 42 of the two yokes 26 and 28 cooperate to receive horizontal pivots 44 and 46 so as to adapt the beams 16, 18 for vertical swinging movement.

Figure 4:
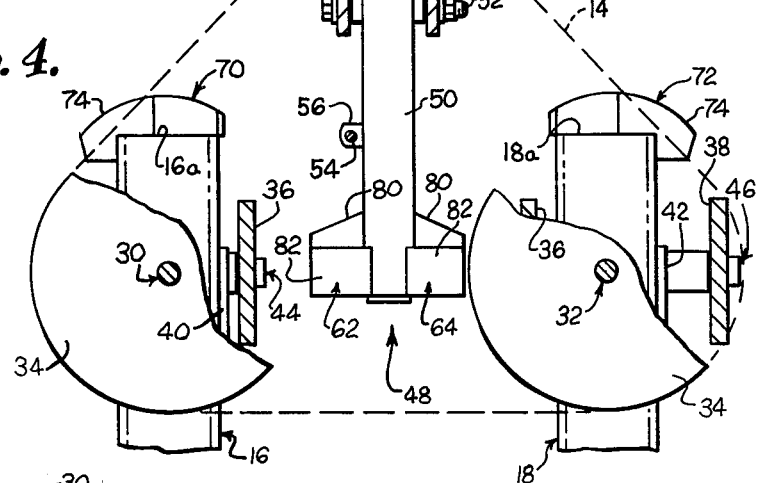
FIG. 4 is a view of the implement similar to FIG. 3, but showing the tool beams swung back into their transport positions.

The inner ends 16a and 18a of the beams 16 and 18, respectively, project inwardly beyond the pivots 30, 32 and 44, 46, it being noted that the axes of the vertical pivot 30 and the horizontal pivot 44 intersect one another while the same is true of the axes of the other vertical pivot 32 and the other horizontal pivot 46. Such inner ends 16a and 18a are disposed in substantially opposed relationship to one another when the beams 16 and 18 are in their widespread, working positions as illustrated in FIGS. 1 and 3. On the other hand, when the beams 16 and 18 are swung rearwardly about the vertical pivots 30, 32 into transport positions in which the beams 16 and 18 are substantially parallel to the longitudinal axis of the frame 10, the inner ends 16a and 18a are out of said opposed relationship as illustrated in FIG. 4.

A special coupling 48 is provided along the frame 10 below the plate 14 and between the ends 16a and 18a of the beams 16, 18 when the latter are in their widespread positions. Such coupling 48 includes a rigid, fore-and-aft extending member 50 having a transverse pivot 52 adjacent its front end with the frame 10 so that the member 50 is adapted for vertical swinging movement about pivot 52. A link 54 suspended from the frame 10 passes through a laterally projecting ear 56 on the member 50 and is surrounded by a coil spring 58 between the ear 56 and a lower limit 60 on the link 54. Consequently, the spring 58 provides a yieldable lower stop for the member 50 and yieldably biases the same upwardly toward its normal position, as illustrated in FIG. 2.

A pair of male parts 62 and 64 project laterally from the rear end of the member 50 for reception within fore-and-aft extending slots 66 and 68 in a pair of female parts 70 and 72, respectively, on the corresponding inner ends 16a and 18a of the beams 16 and 18. Each of the female parts 70, 72 includes a pair of vertically spaced-apart, upper and lower flanges 74 and 76 which are welded or otherwise rigidly affixed to the inner ends 16a and 18a. As illustrated, the flanges 74 and 76 are generally crescent-shaped when viewed in plan, as in FIG. 3, and are flared vertically in opposite directions adjacent their rear ends so as to present a forwardly tapering, flared entry mouth 78. Likewise, the forward end of each of the male parts 62 and 64 has oppositely sloping surfaces which converge to a tip 80 for the purpose of guiding the parts 62 and 64 into the entry mouths 78 of female parts 70, 72 during operation.

As illustrated perhaps best in FIG. 2, each of the male parts 62, 64 has upper and lower surfaces 82 and 84, respectively, that converge laterally outwardly such that each of the parts 62 and 64 can be said to taper toward a reduced cross-sectional dimension as the part 62 or 64 is traversed in a laterally outward direction. As illustrated, this tapering configuration has the effect of reducing the cross-sectional dimensions of the parts 62 and 64 relative to their slots 66 and 68. Hence, there is a sloppy fit between the parts 62, 64 and their corresponding slots 66, 68 to such an extent that, taking the beam 18 as an example, beam end 18a is effectively pivotally connected to the part 64 about a fore-and-aft extending axis. Although this type of pivoting action is provided, nonetheless it should be apparent that the opposite surfaces 82 and 84 of each of the male parts 62 and 64 are situated in vertical force-transmitting relationship with the flanges 74 and 76 of the female parts 70, 72 when the beams 16 and 18 are in their working positons of FIG. 3. Hence, again taking the beam 18 as an example, although beam 18 can swing upwardly and downwardly about the horizontal pivot defined by the loose insertion of tapered male part 64 within female part 72, inner end 18a cannot swing up and down about pivot 46 relative to the opposed beam end 16a.

Each of the beams 16 and 18 has a gang of discs 86 suspended below the same via struts 88. The concavo-convex discs 86 are arranged with their concave surfaces facing outwardly when the beams 16 and 18 are in their working positions of FIG. 1. This also disposes the concave surfaces in an oblique disposition with respect to the path of travel of the implement such that the concave surfaces are receiving considerable thrust from the ground and are transmitting such thrust inwardly along the gang toward the central frame 10. Each of the beams 16 and 18 is also provided with a pair of caster wheels 90 and 92 that are controlled by hydraulic lift cylinders (not shown) operating in conjunction with the cylinder for the frame wheel assembly 20 so as to raise and lower the beams 16 and 18 simultaneously with raising and lowering of the frame 10. Folding elbow linkages 94 and 96 on opposite sides of the frame 10 are releasably held in the working position of FIG. 1 by releasable latch means 98, thus to maintain the beams 16 and 18 in their working positions, but upon release of the latch means 98, the linkages 94 and 96 can swing outwardly and rearwardly about rearwardly disposed pivots 100 and 102 with the frame 10 so as to permit the beams 16 and 18 to swing back into their transport positions as fragmentarily shown in FIG. 4.

OPERATION

Assuming that the implement is advancing along the field wth the discs 86 in engagement with the ground and the beams 16 and 18 in their working positions, the arrangement of things is as illustrated in FIG. 2, wherein the beams 16 and 18 are substantially level with the ground. This is also illustrated schematically in FIG. 6 by the solid lines, it being noted that, for purposes of clarity of understanding, the inner ends of the beams 16 and 18 are shown joined by a single horizontal pivot 48 instead of by the two separate pivots defined by the male and female parts 62, 70 and 64, 72.

If the outer end of the beam 18, for example, should encounter a rise in the terrain while the left beam 16 does not, the result is a change as illustrated in phantom lines in FIG. 6. Instead of the inner end 18a of the beam 18 swinging downwardly about pivot 46, the coupling 48 through its connection to the other beam 16 precludes such downward swinging of inner end 18a such that the entire beam 18 must rise up about the pivotal coupling 48. This also lifts horizontal pivot 46 and tends to twist or cant the frame 10 about the other horizontal pivot 44 as shown. As a result of these occurrences, the inner end of the disc gang 86 associated with beam 18 is kept from digging into the soil too deeply, and yet, the beam 18 is quickly restored to its normal position once the rise has been passed over.

As another example, suppose if the two beams 16 and 18 were not connected together by pivotal coupling 48, then only the right beam 18 and its pivot 46 would rise. The strong side thrust above-referred to along the right gang 86 would tend to keep the pivot 46 and the inner end of the beam 18 raised even after the obstruction was passed over by the right wheel 24, obviously a poor situation.

However, because of the presence of the coupling 48, the inner ends of both beams 16 and 18 are raised together at this time by the obstruction, and the added weight of the left beam 16 helps encourage the right beam 18 and the pivots 46 and 48 to return down to their normal conditions immediately upon passing over the obstruction or irregularity.

In reality, of course, the coupling 48 behaves as two separate pivots as earlier explained, rather than as oversimplified in FIG. 6. However, the effect is the same, i.e., the inner ends 16a and 18a of beams 16 and 18, respectively, must remain at the same height relative to one another, and thus, problems of untoward digging in or remaining lifted long after the obstruction has passed are substantially mitigated.

When it is time to swing the beams 16 and 18 into their transport positions, this is accomplished quite simply by releasing the latch means 98 and pulling the frame 10 forwardly while the ground resistance, working through the discs 86, swings the beams 16 and 18 rearwardly into their transport positions shown fragmentarily in FIG. 4. During such rearward swinging of the beams 16 and 18, the female parts 70 and 72 swing forwardly as the male parts 62 and 64 slip through the slots 66 and 68. By the time the beams 16 and 18 have swung approximately half the distance to their rear transport positions, the female parts 70 and 72 have fully released the male parts 62 and 64 such that the member 50 remains supported by the link 54 and its spring 58.

To ready the implement for action, the beams 16 and 18 are simply swung forwardly, or the frame 10 is pushed rearwardly while the discs 86 remain in the ground. Re-engagement of the female parts 70 and 72 with the male parts 62 and 64 is facilitated at this time by the tapered tips 80 of male parts 62 and 64 and by the flared entry mouths 78 associated with the female parts 70 and 72. Once the beams 16 and 18 are fully forward to their positions of FIGS. 1 and 3, the latch means 98 re-secures the linkages 94 and 96 so that the implement is once again in condition for working the ground.

I claim:

1. In an implement having a pair of horizontal tool beams with inner ends disposed in normally mutually opposed relationship, the improvement comprising:
    a vertical pivot for each of said beams respectively enabling said ends to be swung horizontally into and out of said opposed relationship;
    a horizontal pivot for each of said beams, respectively,
    said ends being spaced inwardly beyond said vertical and horizontal pivots when said ends are in said opposed relationship;
    a rigid frame associated with said pivots and maintaining the same at fixed distances from one another; and
    a pivotal coupling between said ends of the beams maintaining said ends at substantially the same relative vertical position when said ends are in said opposed relationship notwithstanding relative swinging of the beams about said vertical and horizontal pivots.

2. In an implement having a pair of horizontal tool beams with inner ends disposed in normally mutually opposed relationship, the improvement comprising:
    a vertical pivot for each of said beams respectively enabling said ends to be swung horizontally into and out of said opposed relationship;
    a horizontal pivot for each of said beams, respectively;
    a rigid frame associated with said pivots and maintaining the same at fixed distances from one another; and
    a pivotal coupling between said ends of the beams maintaining said ends at substantially the same relative vertical position when said ends are in said opposed relationship notwithstanding relative swinging of the beams about said vertical and horizontal pivots,
    said coupling including a rigid member held against rotation relative to the frame, said member and said ends of the beams having parts that are interengageable in substantially vertical fore-transmitting relationship when said ends are in said opposed relationship.

3. In an implement as claimed in claim 2, wherein said member is provided with a pair of oppositely projecting male parts and said ends of the beams are provided with female parts disposed to receive the corresponding male parts when the ends are swung to said opposed relationship.

4. In an implement as claimed in claim 3, wherein each of said female parts comprises a pair of vertically spaced flanges defining a slot therebetween for the corresponding male part.

5. In an implement as claimed in claim 4, wherein each of said slots has a flared mouth to facilitate entry of the corresponding male part.

6. In an implement as claimed in claim 2, wherein said member is pivoted to said frame for up-and-down movement with said inner ends of the beams.

7. In an implement as claimed in claim 1, wherein said coupling is adapted to interconnect said inner ends of the beams when the same are in said opposed relationship and to disconnect said ends when they are out of said opposed relationship.

8. In an implement as claimed in claim 7, wherein said frame has a fore-and-aft extending longitudinal axis with respect to the normal path of travel of the implement, said vertical pivots being on opposite sides of said axis and said beams being horizontally swingable between laterally widespread working positions in which said inner ends are in said opposed relationship and laterally retracted, transport positions in which said beams are substantially parallel to said longitudinal axis.

9. In an implement as claimed in claim 8, wherein said coupling includes a rigid member held against rotation relative to the frame, said member and said ends of the beams having parts that are interengageable in substantially vertical force-transmitting relationship when said ends are in said opposed relationship.

10. In an implement as claimed in claim 9, wherein said member is pivoted to said frame for up-and-down movement with said inner ends of the beams.

* * * * *